3,122,036
WIRE STRIPPER
Archibald T. Flower, 2637 W. Church Road, Glenside, Pa., and David L. Buchanan, 6333 Valley Green Road, Flourtown, Pa.
Filed Nov. 21, 1961, Ser. No. 153,833
8 Claims. (Cl. 81—9.5)

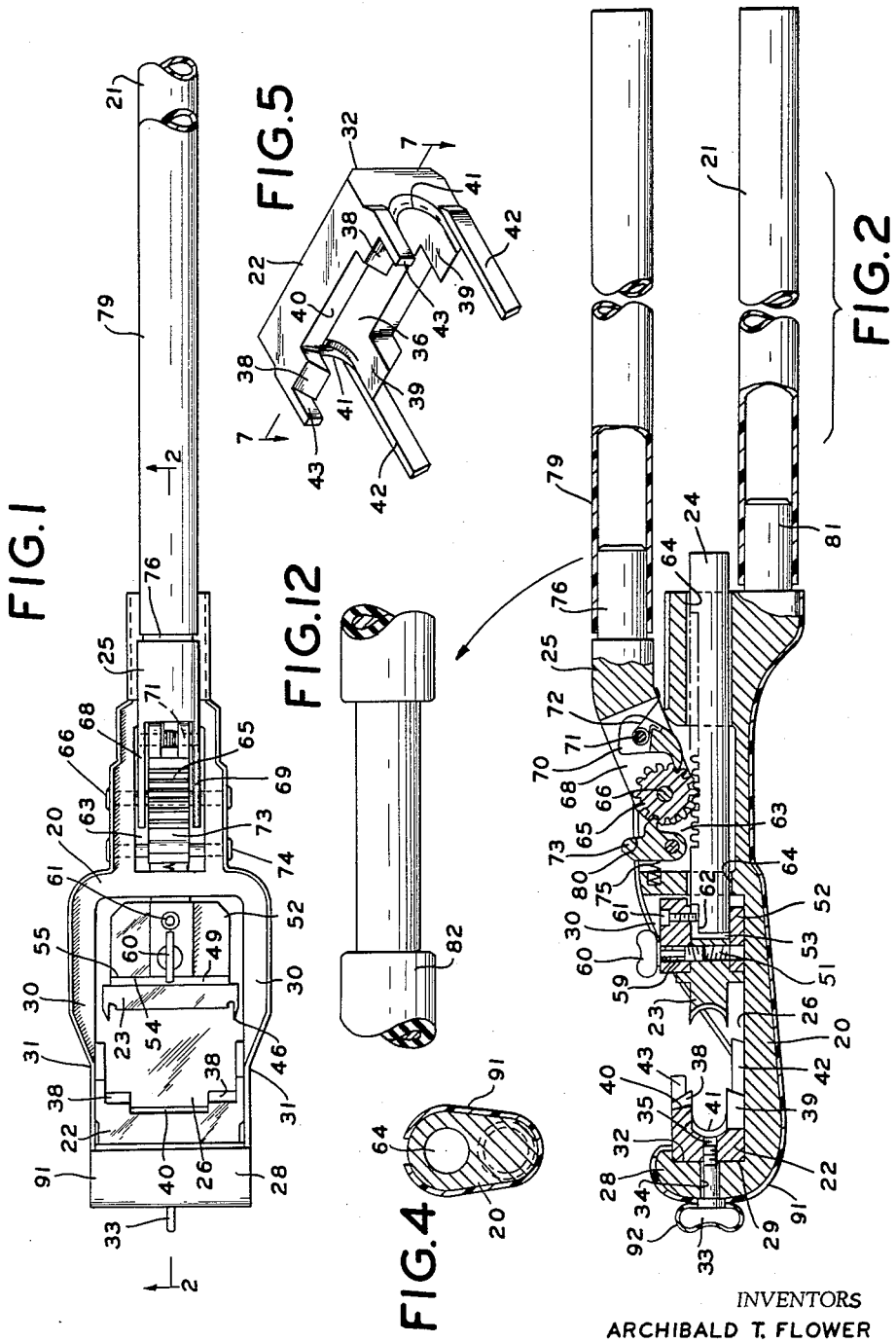

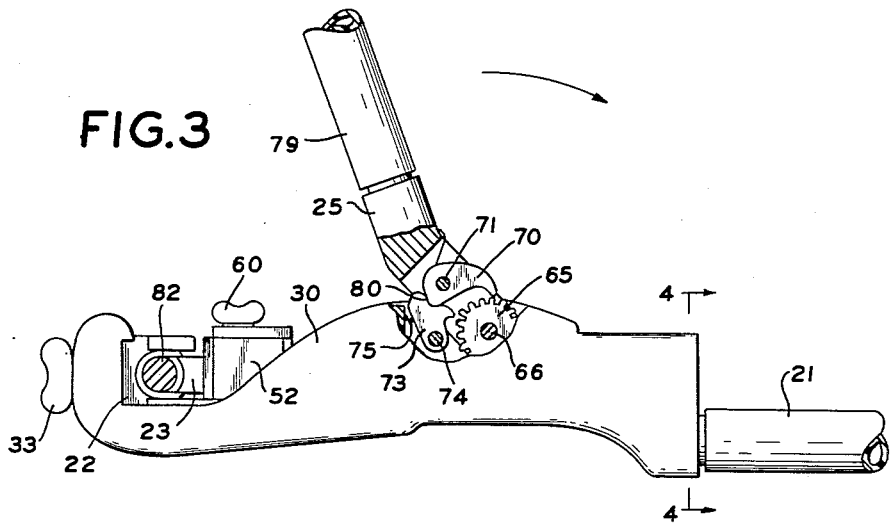
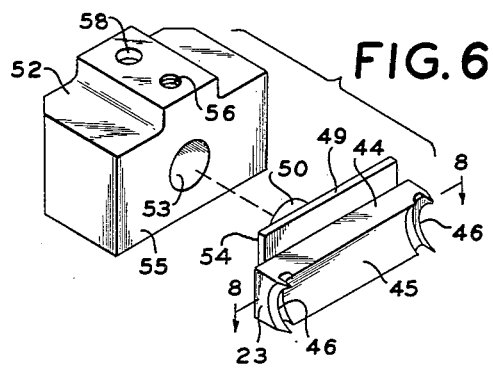
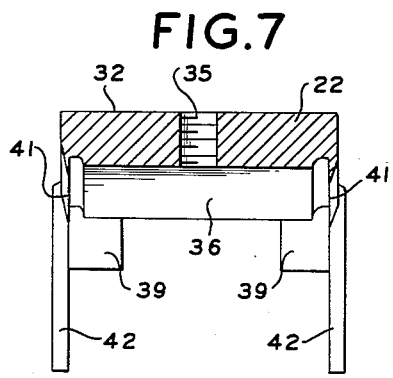
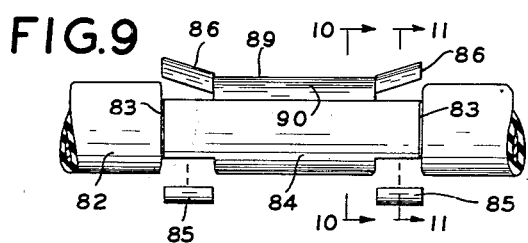
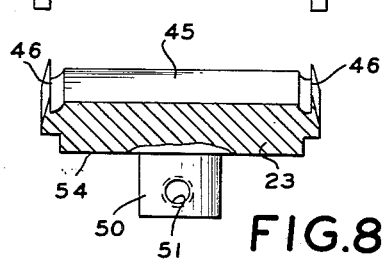
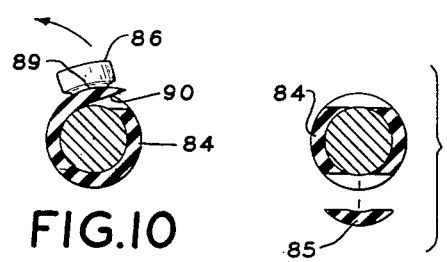
INVENTORS
ARCHIBALD T. FLOWER
BY DAVID L. BUCHANAN
*Frank Kahn*
ATTORNEY Feb. 25, 1964   A. T. FLOWER ETAL   3,122,036
WIRE STRIPPER
Filed Nov. 21, 1961   3 Sheets-Sheet 3
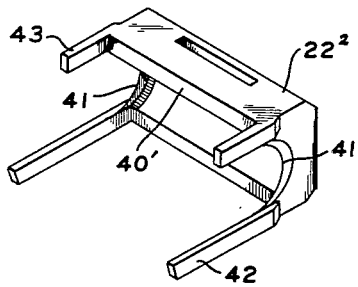
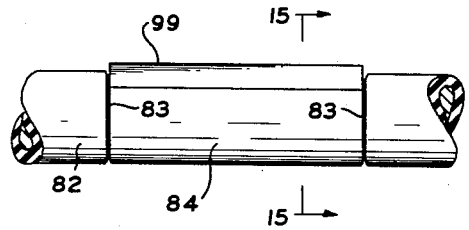
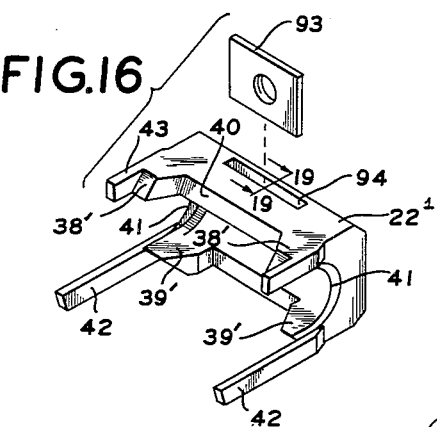
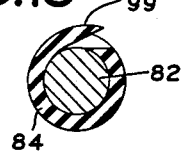
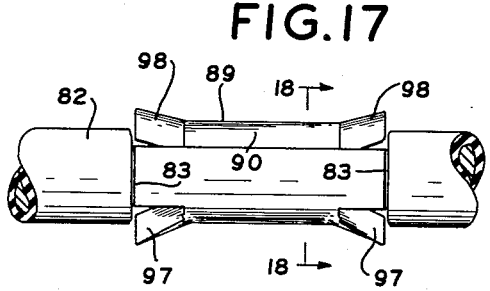
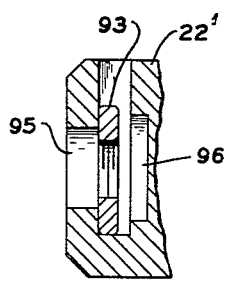
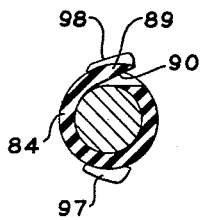
INVENTORS
ARCHIBALD T. FLOWER
DAVID L. BUCHANAN
BY
Frank Kahn
ATTORNEY United States Patent Office 3,122,036
Patented Feb. 25, 1964

This invention relates to wire stripping tools and more particularly to a manually operated insulation incising tool for facilitating the removal of an intermediate portion of the insulation of an insulated electrical conductor.

The present conductors used in electric-power-supply insulated primary and secondary wiring construction are provided with insulating coverings of tough plastic material such as high-molecular-weight polyethylene. When making splices to other conductors, this insulation must be removed or stripped from suitable parts of the conductors. With conventional high-molecular-weight polyethylene insulating, stripping of this insulation with a lineman's knife is accomplished with considerable difficulty and a substantial expenditure of time. In the case of the very tough high-density high-molecular-weight polyethylene insulation, this stripping operation is even more difficult and time consuming.

Hand-plier type stripping tools of the prior art are completely inadequate to cope with these tough insulating materials because even if such tools could be made rugged enough for this purpose it would be impossible for a lineman to exert the necessary force with a hand grip.

It is an object of our invention to provide a light weight wire stripping tool with the aid of which tough insulation may be cleanly and rapidly stripped from insulated power conductor wiring with relatively slight exertion on the part of the operator.

Another object of the invention is to provide a hand-powered tool for easily incising tough power wire insulation in a manner to facilitate ready removal of a short length of the insulation.

A further object of the invention is to provide a manually operated tool for producing two longitudinally spaced circumferential incisions and a longitudinal segmental cut between them through the insulation of a plastic insulated conductor and at the same time turning the edge of the segment outwardly for facilitating its being grasped to peel off the insulation between the circumferential incisions.

Still another object of the invention is to provide an inexpensive hand-powered stripping tool which has a gripping handle and a ratcheted operating handle and which produces exceptionally powerful closing action of insulation incising punch and die elements.

With these and other objects in view which will become apparent from the ensuing description and claims, the following sets forth the details of construction and combination of parts of a specific embodiment of the wire stripper of our invention, which we illustrate as an example, and which will best be understood when read in conjunction with the accompanying drawings in which:

FIG. 1 is a fragmentary plan view of the wire stripper of our invention with the operating handle shown in closed position.

FIG. 2 is a section on the line 2—2 of FIG. 1.

FIG. 3 is a fragmentary side elevational view, partly in section, similar to that of FIG. 2, showing the operating handle in fully open or extended position with the punch fully engaged in the die and enclosing a conductor.

FIG. 4 is a section on the line 4—4 of FIG. 3.

FIG. 5 is perspective view of the die of the device of FIG. 1.

FIG. 6 is an exploded perspective view of the punch and punch holder of the device of FIG. 1.

FIG. 7 is a section on the line 7—7 of FIG. 5.

FIG. 8 is a section on the line 8—8 of FIG. 6.

FIG. 9 is a fragmentary side elevational view of a length of insulated wire showing the incisions made in the insulation by operation of the tool of FIG. 1.

FIG. 10 is a section on the line 10—10 of FIG. 9.

FIG. 11 is a section on the line 11—11 of FIG. 9.

FIG. 12 is a view similar to that of FIG. 9 showing the stripped wire after peeling off the insulation adhering to the wire as shown in FIG. 9.

FIG. 13 is a perspective view of a modification of the die shown in FIG. 5.

FIG. 14 is a fragmentary side elevational view of a length of insulated wire showing the incisions made in the insulation when the die of FIG. 13 is used in the tool of FIG. 1.

FIG. 15 is a section on the line 15—15 of FIG. 14.

FIG. 16 is an exploded perspective view of another modification of the die of FIG. 5.

FIG. 17 is a fragmentary side elevational view of a length of insulated wire showing the incisions made in the insulation when the die of FIG. 16 is used in the tool of FIG. 1.

FIG. 18 is a section on the line 18—18 of FIG. 17.

FIG. 19 is a fragmentary section on the line 19—19 of FIG. 16.

Referring now to the drawing, the embodiment shown in FIGS. 1–7 comprises a body 20, preferably of aluminum, having a gripping handle 21 extending longitudinally rearward, a die 22 detachably fixed to the body near its front end, a longitudinally reciprocable punch 23 engageable with the die 22 and cooperable therewith to incise the insulation of a conductor held in the die, a shaft 24 reciprocable in the body and attached to the punch, and an operating lever 25 pivoted in the body and oscillable to advance the shaft.

As viewed in longitudinal section in FIG. 2, the front portion of the body 20 is deeply recessed from above to provide a flat-bottomed generally rectangular compartment 26 which houses the punch 23 and cooperating die 23. The front end of the compartment 26 is recessed at 29 into the rearward wall of the upstanding front end 28 of the body 20, the recess 29 extending completely across the body. The compartment 26 for a distance from the front end is open on the lateral sides, the rearward portion of the compartment being enclosed by vertical side walls 30 which rise gradually from the level of the compartment floor at respective points 31 to the full height of the compartment at its rearward end.

The die 22 is essentially a block of hard alloy steel having a front end 32 shaped to engage the recess 29 with a sliding fit and is detachably engaged therein by a thumb screw 33 disposed in a longitudinal bore 34 through the end 28 of the body 20 and engaging the threads of an aligned threaded aperture 35 in the die. The rearward end of the die has a transverse medial cylindrical groove 36 of curvature corresponding to the outside of the insulation of the wire to be stripped and extending to near the lateral edges of the die, which serves as a bottoming stop for the insulated wire.

Extending horizontally to the rear at the lateral sides of the die 22 and disposed at a vertical spacing corresponding to the diameter of the conductor of the wire, symmetricaly above and below the axis of the groove 36, are four integral notching blades or eye teeth of relatively short width, the two upper teeth being designated 38 and the lower teeth 39. The vertically opposed surfaces of the teeth 38 and 39 are horizontal plane surfaces with the blades formed by dihedral plane surfaces inclined thereto at a suitable insulation cutting angle, for example approximately 60 degrees.

Between the upper pair of teeth 38 and recessed forwardly with respect thereto is a transverse cutting blade 40 having a lower surface coplanar with the lower surfaces of the adjacent teeth 38. The edge of the blade 40 is similar to those of the teeth 38 except for having a somewhat more obtuse angle. Whereas the teeth 38 and 39 extend rearwardly of the axis of the groove 36 for a substantial distance, the blade 40 extends rearwardly only to this axis or slightly beyond.

At each lateral end of the die 22 are circumferential incising blades 41 of circular arc in parallel vertical planes, coaxial with the groove 36 and of radius corresponding to the core of the wire to be stripped. The cutting edges of the blades 41 are semicircles disposed on the forward side of a vertical diameter and are shown with fillets into the die block on the inward sides for facilitating fabrication, although these fillets are not essential for operation.

Integrally attached to the die 22 laterally outward thereof at each end are rearwardly extending horizontal guide members, a lower guide 42 and an upper guide 43, which receive the conductor to be stripped and guide it for appropriate engagement with the cutting blades of the tool.

The lower guides 42 are long enough so that when the die 22 is secured in the recess 29, they extend for a short distance into the area of the compartment 26 which is enclosed by the walls 30, and are so lateraly spaced as to slide easily between these walls for guiding the die forwardly into proper position for engagement with the screw 33. The upper guides 43 extend only for a relatively short distance rearwardly of the teeth 38. The opposing longitudinal edges of the respective guides 42 and 43 at each end of the die are tangent respectively to the bottom and top of the hypothetical cylinder to the surface of which the groove 36 would conform. These guides serve to receive the conductor to be stripped and to guide it into centered engagement with the cutting blades of the die.

The punch 23 is also of hard alloy steel and is complementary to the die 22. A die-engaging front portion 44 of the punch has a rearwardly concave cylindrical bottoming surface 45 of the same curvature as the groove 36, and semicircular circumferential incising blades 46 at each end identical in dimension with the blades 41, the blades 46 being disposed in the same spatial relation to the surface 45 as the blades 41 bear to the groove 36. When the punch is completely engaged in the die, the incising edges of the blades 41 and 46 form a complete circle of diameter equal to the core diameter of the wire to be stripped.

Rearward of the front die portion 44 for supporting it on a transverse horizontal axis at the proper position for centering engagement with the die 22, the punch 23 has an integral mounting pad 49 provided with a central cylindrical rear extension 50 having a vertical diametral tapped aperture 51.

A punch holder 52 for attaching the punch 23 to the shaft 24 receives the punch extension 50 in a central longitudinal through bore 53, with the rearward face 54 of mounting pad 49 abutting the front face 55 of the holder 52. The top of the holder 52 is provided with front and rear vertical borings, 56 and 58, respectively, communicating with the bore 53 and diametral with respect thereto. The bore 56 aligns with the aperture 51 when the punch is engaged in the holder and is provided with a few threads adjacent the top, the remainder being counterbored from below to a thread clearance diameter to provide a clearance portion 59 of substantial length between the lower end of the threads and the bore 53.

The punch 23 is detachably secured in the holder 52 by means of a captive wing screw 60 from which a number of threads have been removed in the vicinity of the screw head to facilitate removal or replacement of the punch. The length of the threaded portion of the screw 60 is less than the length of the clearance portion 59 of the bore 56 so that the screw may be held clear of the bore 53 by suitably lifting it or engaging its threads in the threaded portion of the bore 56 while the extension 50 is inserted in the bore 53, and also be able to turn freely for facilitating its engagement with the threads of the aperture 51.

The bore 58 is suitably threaded to engage the set screw 61 which secures the punch holder to the shaft 24 suitably flattened at 62 for reception of the set screw.

To the rear of the compartment 26 the upward side of the body 20 is hollowed out to provide a recess 63 which houses the mechanism for moving the shaft 24 and the punch 23 to which it is attached. The shaft 25 is freely reciprocable in a bore 64 which extends longitudinally through the body 20 between the rearward wall of the compartment 26 and the forward wall of the recess 63 and continues through the rearward wall of the recess 63. Transverse teeth are provided along the upward side of the shaft 24 for part of its length to form a rack for engaging a toothed pinion 65 which is freely rotatable on a transverse pin 66 received in the side walls of the recess 63 above the shaft 24.

The operating lever 25 is bifurcated at its inward end to receive the pinion 65, the furcations 68 and 69 of the lever being provided with suitable aligned transverse bores for pivotally engaging the pin 66 on either side of the pinion 64. A pawl 70 engageable with the teeth of the pinion 65 for driving it clockwise, is positioned in the bifurcation of the lever 25 outwardly of the pinion 65 and is pivoted on a transverse pin 71 suitably secured in the furcations 68 and 69. The pivoted end of the pawl 70 is provided with a bifurcation to receive therein a helical spring 72 mounted on the pin 71, which has its ends respectively engaging the pawl 70 and the lever 25 for biasing the pawl into engagement with the teeth of the pinion 65.

A dog 73, engageable with the teeth of the pinion 65 for preventing counterclockwise rotation thereof is pivotally mounted in the recess 63 on a transverse pin 74 secured in the side walls of the recess 63 forwardly of the pinion 65. A compression spring 75 is received in the forward wall of the recess 63 and bears on the dog 73 to bias it into engagement with the teeth of the pinion 65. The lever 25 terminates outwardly in a cylindrical extension 76 tightly engaged by a tubular plastic extension handle 79.

On counterclockwise rotation of the lever 25 from the position shown in FIG. 2, the pawl 70 slips over the teeth of the pinion 65 whose rotation is prevented by the dog 73. The pawl 70 and dog 73 are so related that when the lever 25 nears its limiting counterclockwise position, the pivoted end of the pawl engages the outward end 80 of the dog and continuation of this rotational movement causes the dog to release its locked engagement with the teeth of the pinion 65, as illustrated in FIG. 3. With the lever 25 held in this position, the shaft 24 has free longitudinal movement so that when the tool is held in vertical position with the front end upward the shaft will drop by gravity to its rearward limiting position. Subsequent clockwise rotation of the lever 25 releases the dog 73 so that it engages the pinion 65 for preventing counterclockwise rotation and causes the pawl 70 to rotate the pinion 65 clockwise and thus drive the shaft 24 to the left.

Although the position of the mechanism selected for illustration in FIGS. 1 and 2 to facilitate description is not a normal one because the shaft is not normally at its extreme rearward limit of movement when the operating lever is in the fully closed position shown, the tool is easily placed in this condition by retracting the pawl 70 and the dog 73 (both of which are readily accessible when the lever is in the closed position) from engagement with the pinion 65 and sliding the shaft 24 rearwardly.

The rear end of the body 20 has a downward protrusion which is provided with a rearward cylindrical extension 81 tightly engaged by the tubular plastic gripping handle or grip 21.

The operation of the tool is as follows:

With the tool grasped by the handle 21 and held vertically with the front end upward, the operating lever 25 is rotated to the fully extended position of FIG. 3, which frees the shaft 24 so that it drops to the rearward limiting position illustrated in FIG. 2, as previously explained. In this condition the punch 23 is fully retracted from the die 22 providing adequate space between the punch and die for reception of the wire to be stripped. The tool is now applied transversely to a substantially horizontal length of wire to be stripped so that it is suspended therefrom with the wire disposed within the compartment 26 between the lower guides 42 and the upper guides 43.

The lever 25 is then oscillated by means of the handle 79 to ratchet the shaft 24 in a forward direction and thus moves the punch 23 forwardly until its movement is limited by the insulation of the wire bottoming at the front in the groove 36 of the die and at the rear in the concave surface 45 of the punch. This movement incises the insulation in a manner to be presently described and, because of the exceptionally high mechanical advantage of the lever system, is accomplished with only slight exertion on the part of the operator even in the case of very tough insulating material.

The handle 79 is then extended to its fully open position so that the relative disposition of the tool and the wire from which it is suspended is as illustrated in FIG. 3. The tool is now shaken to release the punch from its engagement in the insulation of the wire and the punch drops to its rearmost position, as in FIG. 2. The tool is then lifted to free the die 22 from engagement with the wire 82 and the tool may be removed.

During the forward movement of the punch, each perspective opposing pair of incising blades 41 and 46 cooperatively produces a circumferential incision 83 completely through the insulation 84 without damaging the underlying core. At the same time, the two lower eye teeth 39 cut or chisel out short segments 85 of the under side of the insulation, as indicated in FIGS. 9 and 11, the die body between the two teeth 39 being recessed forwardly enough to provide clearance for the intermediate insulation.

Also during the forward movement of the punch, the two upper eye teeth 38 similarly start to cut or chisel corresponding short segments from the top side of the insulation, lifting the cut segmental portions 86 upwardly as they advance, but when these teeth are half way through the insulation the intermediate cutting blade 40 begins to cut an aligned segmental slice of the insulation for the full distance between the teeth 38. At the forward limit of movement of the punch, the teeth 38 have cut completely through the insulation and the blade 40 has cut half way through and has raised the edge of the cut slice 89, the under side of which is shown at 90 in FIGS. 9 and 10.

The end segments 86 of the insulation cut by the teeth 38 are completely severed on the outward or die edge side of the teeth but are cut only half way through on the inward side of the teeth so that they remain partially attached to and raised with respect to the slice 89. It is then a simple matter to grasp the upwardly protruding central insulation slice 89 with the fingers or a pair of pliers and peel off the remaining insulation between the circumferential incisions 83.

A cover 91 of tough flexible insulating plastic, for example acrylonitrile-butadiene-styrene copolymer, which is commercially available from the U.S. Rubber Co. under the designation "Royalite" is hot formed to snugly partially envelope the body 20 for the purpose of insulating the tool from inadvertent metallic contact with possibly live adjacent wires or objects. The cover 91 completely covers the bottom and sides of the body 20, folds over the front end 28 of the body as far as the recess 29, extends a short distance beyond the sides of the body rearwardly as far as the rear wall of the recess 63, and at the rear end is folded partially over the top of the body as shown in FIG. 4. The cover 91 may be readily removed for replacement and is suitably apertured at the front end to receive the thumb screw 33 whose head is also provided with an insulating covering 92 of the same material.

Although the shaft 24 has been illustrated and described as being advanced by a rack integral therewith engaging a pinion which in turn is rotated by a pawl actuated by the operating lever 25, it is within the scope of our invention to advance the shaft by applying thereto a a longitudinal force exerted through other high-mechanical-advantage lever-operated mechanism such as the conventional hydraulic pump and ram. An example of a suitable mechanism of this kind is that exemplified in U.S. Patent No. 2,165,504 issued to Edward M. Pfauser on July 11, 1939 which shows a lever-operated single-action hydraulic pump unit with a liquid reservoir, having pressure-tight communication with a ram cylinder provided with a cooperating ram plunger, and a manually-operable pressure-release valve to return the liquid to the reservoir. To adapt this mechanism of Pfauser to power our wire stripper merely requires conversion of the recess 63 into a ram cylinder to enclose the shortened rear portion of the shaft 24 functioning as a cooperating ram plunger, mounting of the communicating pump unit on the body 20 so that its operating lever is in the same relative position as the handle 79, attachment of the fluid reservoir laterally paralleling the body 20, and mounting of the manually-operable valve for release of the pressure and return of the hydraulic fluid to the reservoir, at a convenient position to one side of the body 20. To facilitate return of the punch 23 to its rearmost or fully retracted position after the release of pressure, in readiness for placing the guides of the die over the wire to be stripped, the shaft 24 or the punch 23 may be rearwardly spring biased in conventional manner.

In the die modification illustrated in FIGS. 16–19, the die $22^1$ is identical with the die 22 except for differences in shape of the cutting edges of the eye teeth 38' and 39' and for use of a nut 93 arranged to engage the screw 33, in place of the threaded aperture 35 of the die 22. The die $22^1$ has a narrow transverse rectangular aperture 94 let in from the top of the front to receive the rectangular nut 93 with a sliding transverse fit, a longitudinal clearance bore 95 forward of the aperture 94 for receiving the screw 33, and a somewhat larger coaxial clearance bore 96 rearward of the aperture 94. This alternate method of attaching the die to the body is used when it is impractical to form threads in the die material, such as in the aperture 35.

The cutting edges of the teeth 38' and 39' of the die $22^1$ extend transversely inward for only part of the width of the teeth 38 and 39, then slant inwardly and forwardly to meet the blade 40 so that they make increasingly longer incisions lengthwise of the insulation as the wire is advanced into the die. The resultant incised insulation, shown in FIGS. 17 and 18, has both protruding lower ears 97 and protruding upper ears 98 adhering to the central portion, so that the entire insulation portion between the circumferential incisions 83 peels off in one piece leaving no parts likely to foul the die.

In the die modification illustrated in FIGS. 13–15, the die $22^2$ is identical with the die $22^1$ except for the absence of the eye teeth and the widening of the cutting blade 40' so that it extends completely across between the circumferential blades 41 at the respective ends. The resultant incised insulation, shown in FIGS. 14 and 15, has only a single raised lengthwise slice 99 which may be readily grasped to remove the section of insulation in one piece.

Our stripping tool has been illustrated as being used for stripping the insulation from conductors having solid cylindrical metal cores, but it is equally as effective in stripping insulation from stranded wires and cables.

It is of course to be understood that the spacing between the incising blades 41 of the die 22 may be of any desired length so that the resulting bare length of the core, as illustrated in FIG. 12, is suitable for attachment of the connector to be used, for example 2 inches, 4 inches, or more if desired. However, when it is desired to remove the insulation on a substantially longer portion of the conductor, for example a length of a foot or more for deadending, to strip the insulation from such length it is desirable to remove consecutive shorter portions thereof by successive applications of the tool in order to avoid scoring or otherwise damaging the underlying core. When making the consecutive incisions, the cooperating pairs of circumferential blades 41 and 46 should be applied to whole or unmutilated insulation rather than to bare wire or an incised portion of insulation. Accordingly, the tool is applied with the blade 41 spaced from about ⅛ to ⅜ inch from a preceding circumferential incision. This procedure leaves an annulus of insulation which will have been loosened from the core sufficiently to permit its being readily slid along the wire and removed.

It is further to be understood that the term high-mechanical-advantage as used in the specification and claims hereof in reference to the mechanism for advancing the shaft 24, refers to the ratio of the force applied to the handles 21 and 79 adjacent their outer ends and tending to rotate them toward closed position, to the force tending to advance the punch 23 into engagement with the die 22, and connotes a value of said ratio of the order of 25 to 1 or higher.

Although the invention has been described in considerable detail, such description is intended as illustrative rather than limiting, as other embodiments as well as obvious modifications in construction and arrangement will be evident to those skilled in the art and may be made if desired without departing from the spirit or scope of our invention.

We claim:

1. A wire stripper comprising an elongate body having a forward recessed compartment, a die fixed to said body at the front of said compartment having two rearwardly directed spaced semicircumferential incising blades, a punch in said compartment rearwardly of said die having forwardly directed blades and being movable longitudinally toward and away from said die, guide means on said die for receiving and positioning a transverse insulated conductor to be stripped, said punch being cooperatively engageable with said die for producing two spaced circumferential incisions in the insulation of the conductor received in said guide means, means for advancing said punch into engagement with the conductor and said die, said die including a transverse cutting blade intermediate said semicircumferential blades adapted to incise the insulation of said conductor inwardly along a plane longitudinal with respect to said body and tangent to the core of the conductor, until said transverse blade reaches the line of tangency and to deform the segmentally incised insulation in an outward direction to produce a protruding slice thereof, and said die having a pair of notching blades adjacent each said semicircumferential blade, adapted to incise the insulation segmentally along respective parallel planes longitudinal with respect to said body and tangent to the core of the conductor on either side thereof, the incision made by said transverse blade being coplanar with one of each of said pair of notching blades.

2. The stripper of claim 1 in which the cutting edges of said notching blades are parallel to the cutting edge of said intermediate transverse blade.

3. A wire stripper comprising an elongate body having a forward top recess, a die in the front portion of said recess fixed to said body, a punch cooperatively engageable with said die in said recess rearwardly of said die and longitudinally movable toward and away from said die, rearwardly extending guides on each side of said die to receive and position an insulated conductor in the path of movement of said punch, the front portion of said recess being laterally unobstructed for access of said conductor, a shaft longitudinally slidable in said body and extending forwardly into said recess and fixed to said punch, a rearwardly extending gripping handle on said body, an operating lever having an end pivoted in said body and rotatable toward and away from said handle, means carried by said body and cooperatively associated with said shaft and said lever for advancing said shaft when said lever is rotated toward said handle, means associated with said shaft advancing means for retracting said shaft to provide access for said conductor between said punch and said die, an incising blade on said die for producing a semicircumferential incision on the forward side of said conductor when it is advanced into said die, and an incising blade on said punch for simultaneously producing a registering semicircumferential incision on the rearward side of the conductor.

4. The stripper of claim 3 in which said punch and die have a plurality of said registering incising blades for producing a plurality of spaced circumferential incisions along the conductor.

5. The stripper of claim 3 in which said punch and die have two pairs of registering incising blades for producing two spaced circumferential incisions along the conductor.

6. The stripper of claim 5 having a transverse cutting blade intermediate said pairs of incising blades, adapted to incise the insulation of said conductor along a longitudinal plane tangent to the core of the conductor, inwardly until said transverse blade reaches the line of tangency and to deform the segmentally incised insulation in an outward direction.

7. The stripper of claim 3 in which said operating lever has an extension handle of insulating material, said gripping handle is of insulating material, and the front, bottom and sides of said body are covered with a tough insulating plastic material whereby to prevent inadvertent metallic contact of the stripper with electrified objects during use.

8. The stripper of claim 3 in which said die is detachably fixed to said body and said punch is detachably fixed to said shaft.

References Cited in the file of this patent

UNITED STATES PATENTS

| Re. 14,614 | McKenney | Mar. 18, 1919 |
|---|---|---|
| 663,970 | Krobe | Dec. 18, 1900 |
| 880,790 | Goehst | Mar. 3, 1908 |
| 1,019,835 | Prack | Mar. 12, 1912 |
| 1,406,486 | Perlman | Feb. 14, 1922 |
| 1,946,239 | Ryan | Feb. 6, 1934 |
| 2,036,463 | Deaver | Apr. 7, 1936 |
| 2,636,408 | Mitchell | Apr. 28, 1953 |
| 2,722,145 | Schulenburg | Nov. 1, 1955 |
| 2,800,042 | Demler | July 23, 1957 |
| 2,827,405 | Evans et al. | Mar. 18, 1958 |
| 3,057,232 | Cornell | Oct. 9, 1962 |